United States Patent [19]
Derrick et al.

[11] Patent Number: 5,890,216
[45] Date of Patent: Mar. 30, 1999

[54] APPARATUS AND METHOD FOR DECREASING THE ACCESS TIME TO NON-CACHEABLE ADDRESS SPACE IN A COMPUTER SYSTEM

[75] Inventors: John E. Derrick, Milton, Vt.; Christopher M. Herring, Longmont, Colo.

[73] Assignee: International Business Machines Corporation, Armonk, N.Y.

[21] Appl. No.: 919,578

[22] Filed: Aug. 28, 1997

Related U.S. Application Data

[63] Continuation of Ser. No. 426,777, Apr. 21, 1995, abandoned.
[51] Int. Cl.$^6$ ........................................ G06F 12/00
[52] U.S. Cl. .................... 711/138; 711/118; 711/119; 711/120; 711/121; 711/122; 711/139; 711/150; 711/151; 711/154; 711/167; 711/168
[58] Field of Search ............................ 711/118–122, 154, 711/150–151, 158, 167–168, 138–139

[56] References Cited

U.S. PATENT DOCUMENTS

| | | | |
|---|---|---|---|
| 4,937,738 | 6/1990 | Uchiyama et al. | 364/200 |
| 4,958,351 | 9/1990 | Flora et al. | 371/40.1 |
| 5,045,998 | 9/1991 | Begun et al. | 365/200 |
| 5,125,084 | 6/1992 | Begun et al. | 395/375 |
| 5,136,691 | 8/1992 | Baror | 395/200 |
| 5,157,774 | 10/1992 | Culley | 395/425 |
| 5,175,826 | 12/1992 | Begun et al. | 395/325 |
| 5,210,845 | 5/1993 | Crawford et al. | 711/128 |
| 5,210,847 | 5/1993 | Thome et al. | 395/425 |
| 5,210,850 | 5/1993 | Kelly et al. | 395/425 |
| 5,247,642 | 9/1993 | Kadlec et al. | 395/425 |
| 5,287,481 | 2/1994 | Lin | 395/425 |
| 5,325,508 | 6/1994 | Parks et al. | 711/118 |
| 5,327,545 | 7/1994 | Begun et al. | 395/425 |
| 5,551,006 | 8/1996 | Kulkarni | 711/146 |

OTHER PUBLICATIONS

82385SX High Performance Cache Controller Databook, Intel Corporation, Nov. 1991, pp. 1–77.

*Primary Examiner*—Tod R. Swann
*Assistant Examiner*—Denise Tran
*Attorney, Agent, or Firm*—Schmeiser Olsen & Watts; Eugene I. Shkurko

[57] ABSTRACT

In a computer system, a multi-port bus controller interposed between a CPU, system memory, and an expansion bus detects when a CPU access is to non-cacheable address space and begins a bus cycle to access the data before receiving a "miss" from a cache coupled to the CPU. By detecting non-cacheable address space independently and in parallel with the cache miss determination, the multi-port bus controller saves from one to three clock cycles in each bus cycle that accesses non-cacheable address space.

9 Claims, 2 Drawing Sheets

APPARATUS AND METHOD FOR DECREASING THE ACCESS TIME TO NON-CACHEABLE ADDRESS SPACE IN A COMPUTER SYSTEM

This application is a continuation, of application Ser. No. 08/426,777, filed Apr. 21, 1995, now abandoned.

BACKGROUND OF THE INVENTION

1. Technical Field

This invention generally relates to methods and apparatus for a microprocessor to perform non-cacheable accesses in a computer system, and more specifically relates to a method and apparatus for decreasing the access time to non-cacheable address space by detecting an access to non-cacheable address space and commencing a bus cycle to access the data before the cache indicates a cache miss.

2. Background Art

The use of cache memory in computer systems offers numerous advantages that increase system performance. System memory in a computer is typically slower than the time in which the processor can access the data, requiring the Insertion of one or more wait states. Cache memory is typically small and very fast (no wait states), and may be interposed between a local processor bus and a system bus. The cache typically contains a copy of instructions and/or data from system memory that the processor accesses most frequently. If the instruction or data the processor needs is located in cache memory, the cache signals a "hit," and the instruction or data is accessed at the cache. If the cache does not contain the needed instruction or data, the cache signals a "miss," and the instruction or data is accessed at the system memory. The isolation provided by the cache memory system allows the processor to continue processing from its cache memory on its local bus so long as it receives "hits" while other devices have control of the system bus.

Not all transfers within a computer system are "cacheable," i.e., should be stored in the cache. Specifically, transfers between the processor and devices on an expansion bus in a typical microcomputer system are generally non-cacheable. In addition, certain portions of system memory may be mapped as non-cacheable. Cacheable and non-cacheable accesses are typically defined by the system memory map, with certain addresses defined as cacheable and other addresses defined as non-cacheable. Thus, the cache stores and retrieves data in its memory for cacheable addresses while not storing or retrieving data for non-cacheable addresses.

Various methods of distinguishing cacheable address space from non-cacheable address space are known. One such method is disclosed in U.S. Pat. No. 5,247,642, "Apparatus for Determining Cacheability of a Memory Address to Provide Zero Wait State Operation in a Computer System" (issued Sep. 1993 to Kadlec et al. and assigned to AST Research, Inc.), which is incorporated herein by reference. Kadlec et al. disclose the generation of a cache enable signal by a second level cache to inhibit storing non-cacheable data in the second level cache. Other methods use an address decoder to distinguish between cacheable and non-cacheable address space. For example, U.S. Pat. No. 5,157,774, "System For Fast Selection of Non-cacheable Address Ranges Using Programmed Array Logic" (issued Oct. 1992 to Culley and assigned to Compaq Computer Corp.) discloses a cache that uses programmable array logic to decode address lines to distinguish between cacheable address space and non-cacheable address space, and is incorporated herein by reference. Other examples of address decoders which distinguish cacheable address space from non-cacheable address space are found in U.S. Pat. No. 5,045,998, "Method and Apparatus for Selectively Posting Write Cycles Using the 82385 Cache Controller" (issued Sep. 1991 to Begun et al. and assigned to International Business Machines Corp.); U.S. Pat. No. 5,125,084, "Control of Pipelined Operation in a Microcomputer System Employing Dynamic Bus Sizing with 80386 Processor and 82385 Cache Controller" (issued Jun. 1992 to Begun et al. and assigned to International Business Machines Corp.); U.S. Pat. No. 5,327,545, "Data Processing Apparatus for Selectively Posting Write Cycles Using the 82385 Cache Controller" (issued Jul. 1994 to Begun et al. and assigned to International Business Machines Corp.); U.S. Pat. No. 5,210,850, "Memory Address Space Determination Using Programmable Limit Registers with Single-ended Comparators (issued May 1993 to Kelly et al. and assigned to Compaq Computer Corp.); and U.S. Pat. No. 4,937,738, "Data Processing System Which Selectively Bypasses a Cache Memory in Fetching Information Based Upon Bit Information of an Instruction" (issued Jun. 1990 to Uchiyama et al. and assigned to Hitachi), which are all incorporated herein by reference. The prior art address decoders discussed above for distinguishing cacheable accesses from non-cacheable accesses all provide an output to the cache to determine whether or not action by the cache is needed.

The advantage that cache memory provides in a computer comes at the expense of more complex, hierarchal memory systems. Now a copy of data in system memory may exist in one or more levels of cache, requiring strict adherence to protocol to assure cache coherency, i.e., that identical data in each cache and in system memory are modified or invalidated to reflect the most recent change to the data. Assuring cache coherency requires the cache to monitor all accesses by the CPU to determine whether or not the access may be contained and actually is contained within the cache. Even when the access is to non-cacheable address space, prior art systems typically wait for the cache to respond with a miss before commencing a bus cycle to the non-cacheable address. The cache memory thus can impose a delay in non-cacheable accesses that would otherwise not be present.

Most microcomputer systems are expandable, allowing a user to add certain capabilities to the computer by plugging a circuit card into an expansion bus. Several different types of expansion busses are known, including PCI®, Micro-Channel®, ISA, and EISA. Expansion bus accesses are generally defined as non-cacheable. In addition, as stated above, certain portions of system memory also may be defined as non-cacheable. For a typical non-cacheable transfer in a typical prior art microcomputer system, the presence of the cache delays the access to the data. The processor first snoops the cache to determine whether the needed information is in the cache. A non-cacheable address will cause the cache memory to return a "miss." If the address is to non-cacheable memory, the memory controller performs a bus cycle to system memory to access the data. If the address is to the expansion bus, the expansion bus bridge performs the bus cycle on the expansion bus to access the data. The total access time to a non-cacheable address is therefore the sum of the time to generate a cache miss and the time for the memory controller or expansion bus bridge to generate the appropriate cycle to system memory or to the expansion bus, respectively. The access time to a non-cacheable address is therefore typically one to three clock cycles slower than the access time would be if the cache were not present due to the time required for the cache to signal a miss to the memory controller or expansion bus bridge. Thus we see that the advantages of a cache memory are partially offset by the slower access time to non-cacheable addresses. However, in most microcomputer systems, the number of accesses to cacheable address space is usually far greater than the number of accesses to non-cacheable address space. Thus, the advantage of the cache generally far outweighs the penalty incurred. However, it is clear that the performance of a microcomputer system could be enhanced by decreasing the access time for non-cacheable accesses.

Therefore, there existed a need to provide an apparatus and method for enhancing the performance of a microcomputer that has cache memory by decreasing the access time to non-cacheable address space, such as non-cacheable memory and the expansion bus.

DISCLOSURE OF INVENTION

According to the present invention, the access time to non-cacheable address space is improved by providing circuitry within the bus controller (i.e., external to the cache) that determines when an access is to non-cacheable address space and begins a cycle to access the data without waiting for the cache to signal a miss.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

Figure 1:
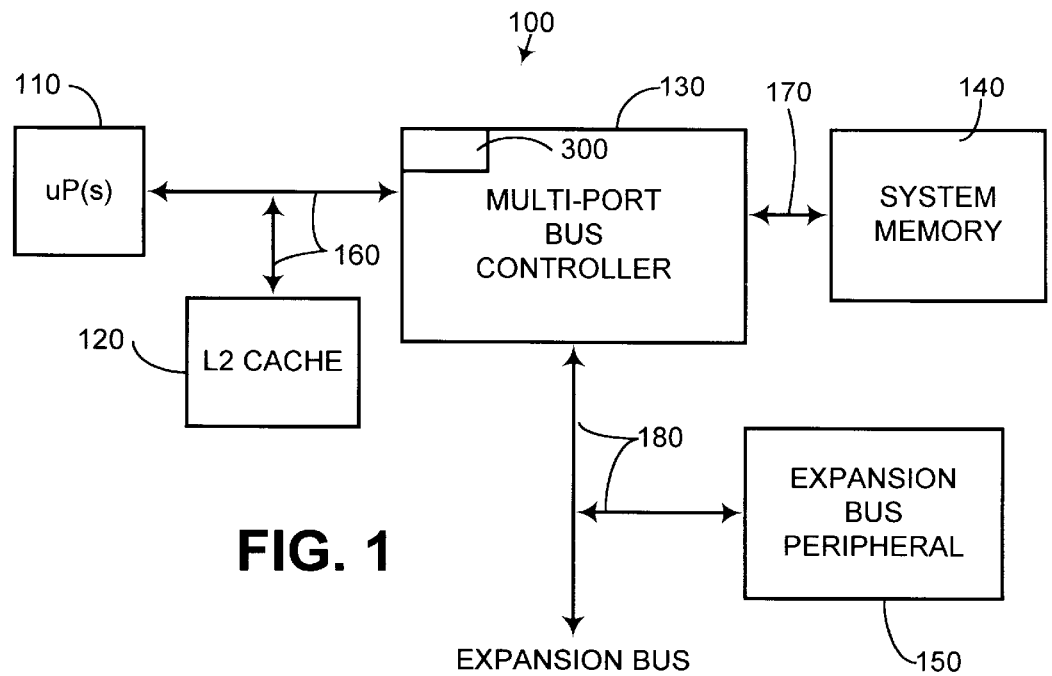
FIG. 1 is a block diagram of a first embodiment in accordance with the present invention.

Referring to FIG. 1, a computing system 100 in accordance with a first embodiment of the present invention includes one or more microprocessors 110; a second level cache 120; a multi-port bus controller 130; system memory 140; one or more expansion bus peripherals 150; a local bus 160; a memory bus 170; and an expansion bus 180. Microprocessor 110 is coupled to cache 120 and multi-port bus controller 130 via local bus 160. Multi-port bus controller 130 is coupled to system memory 140 via memory bus 170, and is coupled to expansion bus peripheral 150 via expansion bus 180.

Multi-port bus controller 130 provides enhanced system operation by detecting when an access is to non-cacheable address space and commencing a bus cycle to access the non-cacheable address prior to receiving a cache miss signal from cache 120. This eliminates any penalty normally associated with cache memory, and enhances system performance by shortening the bus cycle (access time) to non-cacheable address space by at least one clock cycle.

Microprocessor 110 is suitably a conventional microprocessor used in known microcomputer systems, such as an Intel Pentium® microprocessor. Cache 120 is suitably very fast memory (i.e., zero wait state) coupled to microprocessor 110, and selectively stores instructions and/or data most frequently used by microprocessor 110. Multi-port bus controller 130 is a multifunction block of interface and control circuitry, suitably in a chip or chipset, which provides memory control and an expansion bus bridge. Expansion bus 180 is suitably a typical microcomputer expansion bus, such as PCI® Micro-Channel®, ISA, and EISA, but may have other configurations as well.

Figure 3:
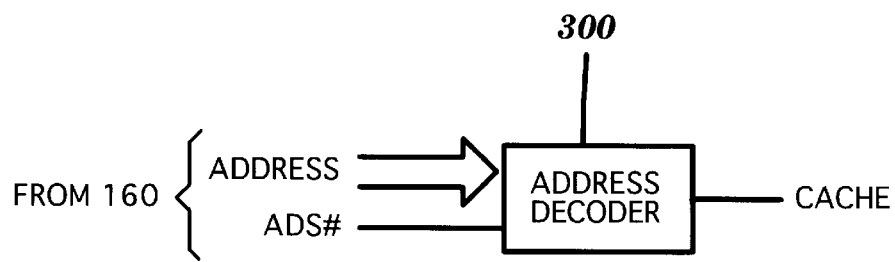
FIG. 3 is a block diagram of the address decoder within the multi-port bus controller.

Accesses to peripherals (e.g., expansion bus peripheral 150) on expansion bus 180 are typically non-cacheable. In addition, a portion of system memory 140 may be designated as non-cacheable. In a prior art computer system with the configuration shown in FIG. 1, the multi-port memory controller typically waits for a negative response ("miss") from ache 120 before commencing bus cycles to non-cacheable addresses. However, multi-port bus controller 130 in accordance with the present invention suitably includes a circuit 300 for determining which CPU accesses are cacheable and which are non-cacheable. Circuit 300 suitably comprises an address decoder, suitably implemented within a programmable logic circuit. Referring to FIG. 3, address decoder 300 analyzes the address of each access on local bus 160, and drives a CACHE output signal high for cacheable accesses, and drives CACHE low for non-cacheable accesses. When multi-port bus controller 130 detects an access to non-cacheable address space, it commences a bus cycle before receiving an indication of a cache miss from cache 120. Indicating a cache miss generally requires at least one system clock cycle. Decoding the address on local bus 160, in contrast, can be done in a small portion of a clock cycle. By bypassing the cache miss generation circuit in cache 120 and directly decoding the address on local bus 160 to determine that an access is to non-cacheable address space, multi-port bus controller 130 saves at least one clock cycle (for fast caches) for each access to non-cacheable address space, and the savings may be as high as two or three clock cycles (for slow caches).

Figure 2:
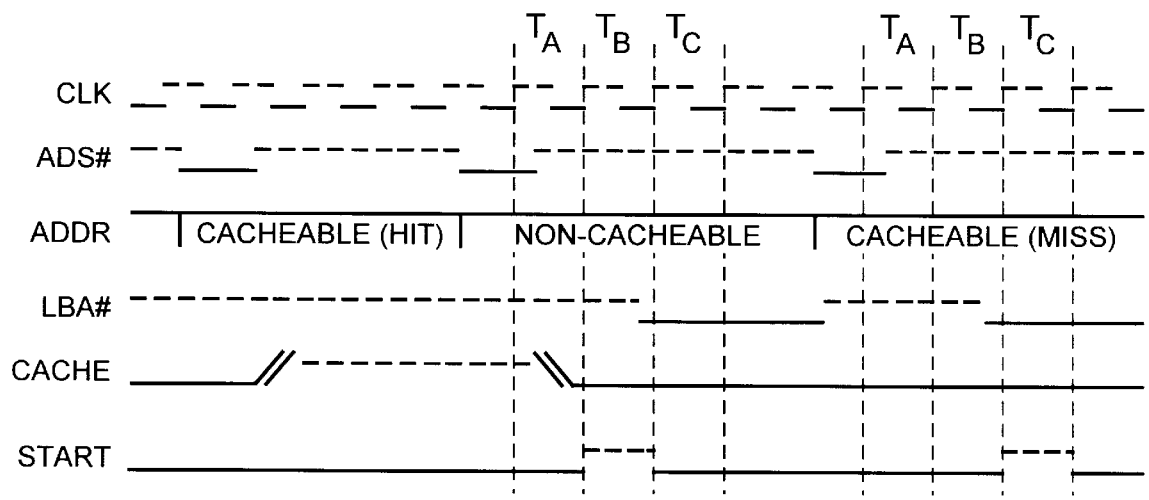
FIG. 2 is a timing diagram showing the improved performance of the computing system in accordance with the present invention.

The improved performance of computing system 100 is apparent in the timing diagram shown in FIG. 2. CLK is the system clock signal; ADS# is the address strobe on local bus 160; ADDR is the address on local bus 160; LBA# is the local bus access line from cache 120 that goes active If the cycle is not a cache hit; CACHE is the output of address decoder 300 within multi-port bus controller 130; and START indicates when multi-port bus controller 130 begins a bus cycle. In a prior art system, a non-cacheable cycle (or cache miss) is indicated by cache 120 asserting LBA# on local bus 160. In response, the prior art multi-port bus controller begins a bus cycle on the next rising edge of CLK, which occurs at the beginning of period $T_C$. In the system 100 in accordance with the present invention, however, address decoder 300 determines that an access is non-cacheable by driving CACHE low, which occurs in period TA. In response to CACHE going low, multi-port bus controller 130 commences a bus cycle to the non-cacheable address at the beginning of period TB, as shown by the assertion of START. Thus, multi-port bus controller 130 commences the bus cycle to a non-cacheable address a full clock cycle earlier than is possible using prior art configurations.

Figure 4:
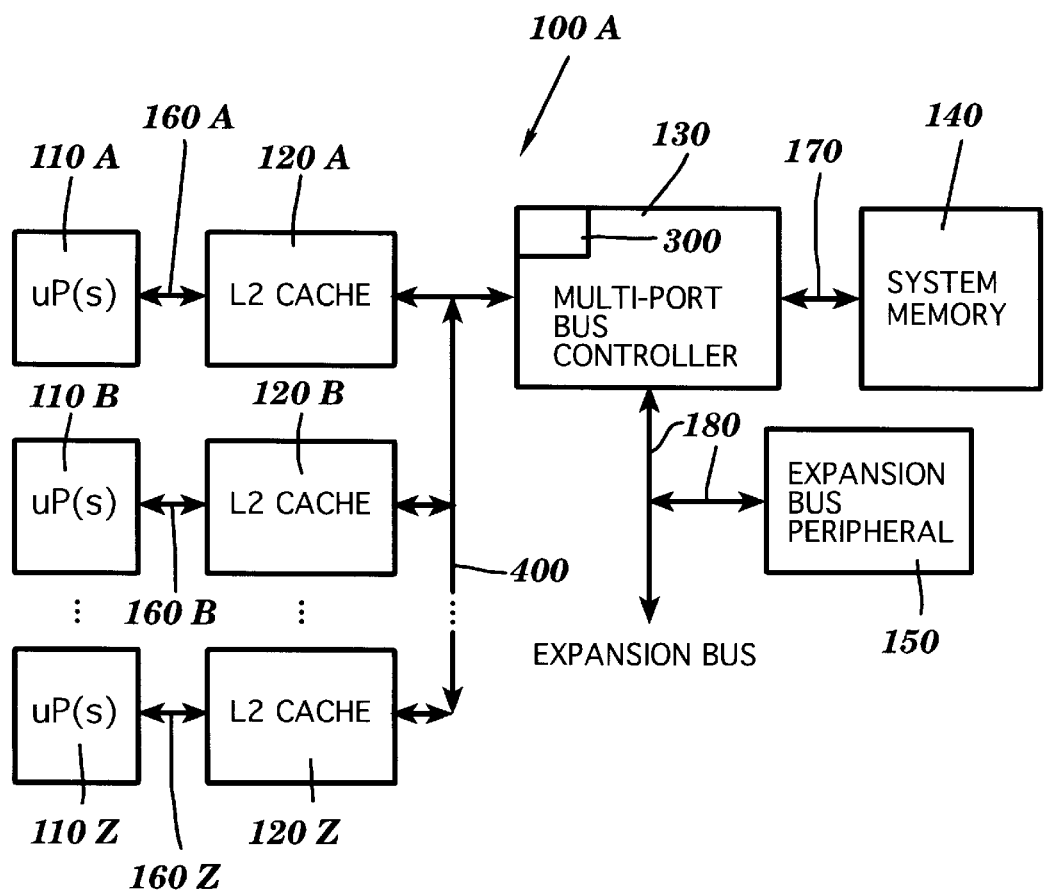
FIG. 4 is a block diagram of a second embodiment in accordance with the present invention.

Referring now to FIG. 4, a second embodiment in accordance with the present invention provides the benefit of enhanced access time to non-cacheable address space in a multiprocessor computer system 100A. One or more microprocessors 110A are all serviced by a common level two cache 120A and are coupled to the cache via a local bus 160A. Likewise, one or more microprocessors 110B are all coupled to and serviced by a common level two cache 120B via local bus 160B, and so on. The level two caches 120A through 120Z are coupled to the multi-port bus controller 130 via a cache bus 400. Multi-port bus controller 130, system memory 140, expansion bus peripheral 150, memory bus 170, and expansion bus 180 perform in the same manner as described above with regard to the first embodiment. Specifically, the timing for any of microprocessors 110A through 110Z accessing the expansion bus peripheral 150 or other non-cacheable address space (e.g., non-cacheable system memory) is improved by at least one full clock cycle, as shown in the timing diagram of FIG. 2.

While the invention has been particularly shown and described with reference to preferred exemplary embodiments thereof, it will be understood by those skilled in the art that various changes in form and details may be made therein without departing from the spirit and scope of the invention. For example, it will be understood that, while various of the conductors or connections are shown in the drawings as single lines, they are not so shown in a limiting sense, and may comprise plural conductors or connections, as is understood in the art.

We claim:

1. In a computer system having at least one CPU, a memory, at least one cache capable of containing only certain selected information coupled to the CPU, and a multi-port bus controller interposed between the CPU, the memory, and at least one bus coupled to at least one peripheral, wherein accesses by the CPU to at least one of the memory and the peripheral cannot be stored in the cache, the multi-port bus controller comprising:

means for determining if information requested by the CPU cannot be contained in the cache; and means for immediately commencing a bus cycle to request the information without waiting for a negative cache response, the bus cycle commencing at least one clock cycle earlier than when an access by the CPU to a cacheable address generates a cache miss.

2. The computer system of claim 1 wherein addresses of accesses by the CPU that cannot be contained in the cache are distinct from addresses of accesses by the CPU that can be contained in the cache.

3. The computer system of claim 2 wherein the means for determining if information requested by the CPU cannot be contained in the cache comprises an address decoder.

4. The computer system of claim 3 wherein the address decoder comprises a programmable logic circuit.

5. In a computer system having a CPU, a memory, a cache capable of maintaining only certain selected information coupled to the CPU, and a multi-port bus controller interposed between the CPU, the memory, and a non-cacheable expansion bus, the multi-port bus controller comprising:

a programmable logic circuit for determining if information requested by the CPU cannot be contained in the cache; and means for immediately commencing a bus cycle to request the information from the expansion bus without waiting for a negative cache response, the bus cycle commencing at least one clock cycle earlier than when an access by the CPU to a cacheable address generates a cache miss.

6. The computer system of claim 5 wherein the programmable logic circuit decodes the address of the CPU and generates an output if the address corresponds to an access to the expansion bus.

7. In a computer system comprising at least one CPU, a memory, at least one cache capable of containing only certain selected information coupled to the CPU, and a multi-port bus controller interposed between the CPU, the memory, and at least one bus coupled to at least one peripheral, wherein accesses by the CPU to at least one of the memory and the peripheral cannot be stored in the cache, a method for decreasing the access time of the accesses by the CPU that cannot be stored in the cache comprising the steps of:

determining in the multi-port bus controller if information requested by the CPU cannot be contained in the cache; and the multi-port bus controller immediately commencing a bus cycle to request the information without waiting for a negative cache response, the bus cycle commencing at least one clock cycle earlier than when an access by the CPU to a cacheable address generates a cache miss.

8. The method of claim 7 wherein the step of determining in the multi-port bus controller if information requested by the CPU cannot be contained in the cache is performed by decoding the address of the CPU access and providing an output when the CPU access cannot be stored in the cache.

9. The method of claim 8 wherein the step of the multi-port bus controller immediately requesting the information is performed in response to the output.

* * * * *